United States Patent
van Rooyen

(10) Patent No.: US 8,272,017 B2
(45) Date of Patent: Sep. 18, 2012

(54) METHOD AND SYSTEM FOR CONCURRENT COMMUNICATING OF HIGH DEFINITION TELEVISION (HDTV) AND STANDARD DEFINITION TELEVISION (SDTV) INFORMATION IN A MULTISTANDARD WIRELESS COMMUNICATION SYSTEM

(75) Inventor: Pieter van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 2050 days.

(21) Appl. No.: 11/237,547

(22) Filed: Sep. 28, 2005

(65) Prior Publication Data

US 2006/0127032 A1 Jun. 15, 2006

Related U.S. Application Data

(63) Continuation-in-part of application No. 11/010,991, filed on Dec. 13, 2004, now Pat. No. 7,286,794.

(51) Int. Cl.
*H04N 7/16* (2011.01)
(52) U.S. Cl. ........................................................ 725/62
(58) Field of Classification Search .................. 725/62, 725/67, 68, 93, 94, 109, 110, 116, 118, 133, 725/141, 153
See application file for complete search history.

(56) References Cited

U.S. PATENT DOCUMENTS

| | | | | |
|---|---|---|---|---|
| 5,467,132 A | * | 11/1995 | Fazel et al. | 375/240.01 |
| 6,133,910 A | * | 10/2000 | Stinebruner | 725/49 |
| 6,163,683 A | * | 12/2000 | Dunn et al. | 455/151.1 |
| 6,618,585 B1 | | 9/2003 | Robinson | |
| 2004/0136406 A1 | | 7/2004 | Kuramoto | |
| 2004/0230997 A1 | * | 11/2004 | Kaylani | 725/111 |
| 2005/0153650 A1 | | 7/2005 | Hikomoto | |
| 2006/0053450 A1 | * | 3/2006 | Saarikivi et al. | 725/46 |

FOREIGN PATENT DOCUMENTS

| | | |
|---|---|---|
| CN | 1449625 | 10/2003 |
| JP | 2004 040380 | 2/2004 |
| JP | 2004 297628 | 10/2004 |

OTHER PUBLICATIONS

European Patent Office, Communication with European Search Report, dated Jun. 25, 2010, in European Application No. 06011944.3.

* cited by examiner

*Primary Examiner* — Nicholas Corbo
(74) *Attorney, Agent, or Firm* — Thomas, Kayden, Horstemeyer & Risley, LLP

(57) ABSTRACT

Methods and systems for communicating information in a network are disclosed herein and may include receiving, at a mobile terminal, a high definition television (HDTV) signal via a DVB-H downlink communication path. A standard definition television (SDTV) signal may be simultaneously received at the mobile terminal via a cellular downlink communication path. The SDTV signal and the HDTV signal may comprise the same media content. The HDTV signal received via the DVB-H downlink communication path and the SDTV signal received via the cellular downlink communication path may be selected in the mobile terminal for processing. The selection may be based on a preference indicated via the mobile terminal. The selection may also be based on at least one downlink channel condition indicator corresponding to the HDTV signal or the SDTV signal.

3 Claims, 7 Drawing Sheets

METHOD AND SYSTEM FOR CONCURRENT COMMUNICATING OF HIGH DEFINITION TELEVISION (HDTV) AND STANDARD DEFINITION TELEVISION (SDTV) INFORMATION IN A MULTISTANDARD WIRELESS COMMUNICATION SYSTEM

CROSS-REFERENCE TO RELATED APPLICATIONS/INCORPORATION BY REFERENCE

This application is a Continuation-In-Part of U.S. application Ser. No. 11/010,991, filed Dec. 13, 2004, entitled "Method And System For Joint Broadcast Receiving And Cellular Communication At Mobile Terminal Or Device Without Service Control," which is hereby incorporated herein by reference in its entirety.

FEDERALLY SPONSORED RESEARCH OR DEVELOPMENT

Not applicable.

MICROFICHE/COPYRIGHT REFERENCE

Not applicable.

FIELD OF THE INVENTION

Certain embodiments of the invention relate to communication of television signals. More specifically, certain embodiments of the invention relate to a method and system for concurrent communicating of high definition television (HDTV) and standard definition television (SDTV) information in a multistandard wireless communication system.

BACKGROUND OF THE INVENTION

Terrestrial television and radio broadcast networks have made use of high power transmitters covering broad service areas, which enable one-way distribution of content to user equipment such as televisions and radios. By contrast, wireless telecommunications networks have made use of low power transmitters, which have covered relatively small areas known as "cells". Unlike broadcast networks, wireless networks may be adapted to provide two-way interactive services between users of user equipment such as telephones and computer equipment.

The introduction of cellular communications systems in the late 1970's and early 1980's represented a significant advance in mobile communications. The networks of this period may be commonly known as first generation, or "1G" systems. These systems were based upon analog, circuit-switching technology, the most prominent of these systems may have been the advanced mobile phone system (AMPS). Second generation, or "2G" systems ushered improvements in performance over 1G systems and introduced digital technology to mobile communications. Exemplary 2G systems include the global system for mobile communications (GSM), digital AMPS (D-AMPS), and code division multiple access (CDMA). Many of these systems have been designed according to the paradigm of the traditional telephony architecture, often focused on circuit-switched services, voice traffic, and supported data transfer rates up to 14.4 kbits/s. Higher data rates were achieved through the deployment of "2.5G" networks, many of which were adapted to existing 2G network infrastructures. The 2.5G networks began the introduction of packet-switching technology in wireless networks. However, it is the evolution of third generation, or "3G" technology that may introduce fully packet-switched networks, which support high-speed data communications.

The multiple broadcast/multicast service (MBMS) is an IP datacast service, which may be deployed in EDGE and UMTS networks. The impact of MBMS is largely within the network in which a network element adapted to MBMS, the broadcast multicast service center (BM-SC), interacts with other network elements within a GSM or UMTS system to manage the distribution of content among cells within a network. User equipment may be required to support functions for the activation and deactivation of MBMS bearer service. MBMS may be adapted for delivery of video and audio information over wireless networks to user equipment. MBMS may be integrated with other services offered over the wireless network to realize multimedia services, such as multicasting, which may require two-way interaction with user equipment.

Standards for digital television terrestrial broadcasting (DTTB) have evolved around the world with different systems being adopted in different regions. The three leading DTTB systems are, the advanced standards technical committee (ATSC) system, the digital video broadcast terrestrial (DVB-T) system, and the integrated service digital broadcasting terrestrial (ISDB-T) system. The ATSC system has largely been adopted in North America, South America, Taiwan, and South Korea. This system adapts trellis coding and 8-level vestigial sideband (8-VSB) modulation. The DVB-T system has largely been adopted in Europe, the Middle East, Australia, as well as parts of Africa and parts of Asia. The DVB-T system adapts coded orthogonal frequency division multiplexing (COFDM). The ISDB-T system has been adopted in Japan and adapts bandwidth segmented transmission orthogonal frequency division multiplexing (BST-OFDM). The various DTTB systems may differ in important aspects; some systems employ a 6 MHz channel separation, while others may employ 7 MHz or 8 MHz channel separations.

Planning for the allocation of frequency spectrum may also vary among countries with some countries integrating frequency allocation for DTTB services into the existing allocation plan for legacy analog broadcasting systems. In such instances, broadcast towers for DTTB may be co-located with broadcast towers for analog broadcasting services with both services being allocated similar geographic broadcast coverage areas. In other countries, frequency allocation planning may involve the deployment of single frequency networks (SFNs), in which a plurality of towers, possibly with overlapping geographic broadcast coverage areas (also known as "gap fillers"), may simultaneously broadcast identical digital signals. SFNs may provide very efficient use of broadcast spectrum as a single frequency may be used to broadcast over a large coverage area in contrast to some of the conventional systems, which may be used for analog broadcasting, in which gap fillers transmit at different frequencies to avoid interference.

Even among countries adopting a common DTTB system, variations may exist in parameters adapted in a specific national implementation. For example, DVB-T not only supports a plurality of modulation schemes, comprising quadrature phase shift keying (QPSK), 16-QAM, and 64 level QAM (64-QAM), but DVB-T offers a plurality of choices for the number of modulation carriers to be used in the COFDM scheme. The "2K" mode permits 1,705 carrier frequencies that may carry symbols, each with a useful duration of 224 μs for an 8 MHz channel. In the "8K" mode there are 6,817 carrier frequencies, each with a useful symbol duration of 896 μs for an 8 MHz channel. In SFN implementations, the 2K mode may provide comparatively higher data rates but smaller geographical coverage areas than may be the case with the 8K mode. Different countries adopting the same system may also employ different channel separation schemes.

While 3G systems are evolving to provide integrated voice, multimedia, and data services to mobile user equipment, there may be compelling reasons for adapting DTTB systems for this purpose. One of the more notable reasons may be the high data rates that may be supported in DTTB systems. For example, DVB-T may support data rates of 15 Mbits/s in an 8 MHz channel in a wide area SFN. There are also significant challenges in deploying broadcast services to mobile user equipment. Many handheld portable devices, for example, may require that services consume minimum power to extend battery life to a level which may be acceptable to users. Another consideration is the Doppler effect in moving user equipment, which may cause inter-symbol interference in received signals. Among the three major DTTB systems, ISDB-T was originally designed to support broadcast services to mobile user equipment. While DVB-T may not have been originally designed to support mobility broadcast services, a number of adaptations have been made to provide support for mobile broadcast capability. The adaptation of DVB-T to mobile broadcasting is commonly known as DVB handheld (DVB-H).

To meet requirements for mobile broadcasting the DVB-H specification may support time slicing to reduce power consumption at the user equipment, addition of a 4K mode to enable network operators to make tradeoffs between the advantages of the 2K mode and those of the 8K mode, and an additional level of forward error correction on multiprotocol encapsulated data—forward error correction (MPE-FEC) to make DVB-H transmissions more robust to the challenges presented by mobile reception of signals and to potential limitations in antenna designs for handheld user equipment. DVB-H may also use the DVB-T modulation schemes, like QPSK and 16-quadrature amplitude modulation (16-QAM), which may be most resilient to transmission errors. MPEG audio and video services may be more resilient to error than data, thus additional forward error correction may not be required to meet DTTB service objectives.

Time slicing may reduce power consumption in user equipment by increasing the burstiness of data transmission. Instead of transmitting data at the received rate, under time slicing techniques, the transmitter may delay the sending of data to user equipment and send data later but at a higher bit rate. This may reduce total data transmission time over the air, which may be used to temporarily power down the receiver at the user equipment. Time slicing may also facilitate service handovers as user equipment moves from one cell to another because the delay time imposed by time slicing may be used to monitor transmitters in neighboring cells. The MPE-FEC may comprise Reed-Solomon coding of IP data packets, or packets using other data protocols. The 4K mode in DVB-H may utilize 3,409 carriers, each with a useful duration of 448 μs for an 8 MHz channel. The 4K mode may enable network operators to realize greater flexibility in network design at minimum additional cost. Importantly, DVB-T and DVB-H may coexist in the same geographical area. Transmission parameter signaling (TPS) bits that are carried in the header of transmitted messages may indicate whether a given DVB transmission is DVB-T or DVB-H, in addition to indicating whether DVB-H specific features, such as time slicing, or MPE-FEC are to be performed at the receiver. As time slicing may be a mandatory feature of DVB-H, an indication of time slicing in the TPS may indicate that the received information is from a DVB-H service.

Present developments in the communication technology may adapt broadcasting to mobility services. However, broadcasting may often require high bit rate data transmission at rates higher than could be supported by existing mobile communications networks. Furthermore, downlink communication paths which may be utilized for communicating information to one or more receivers may deteriorate. In this regard, significant delays may be experienced at the receiver side for receiving the communicated information. In addition, quality of the received information communicated via a deteriorated downlink communication path may also decrease.

Further limitations and disadvantages of conventional and traditional approaches will become apparent to one skilled in the art, through comparison of such systems with some aspects of the present invention as set forth in the remainder of the present application with reference to the drawings.

BRIEF SUMMARY OF THE INVENTION

A system and/or method for concurrent communicating of high definition television (HDTV) and standard definition television (SDTV) information in a multistandard wireless communication system, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for communicating information via a plurality of different networks within a multistandard wireless communication system. A multistandard wireless communication system may comprise a plurality of different networks and corresponding base stations. Each network may utilize a different communication protocol. For example, one or more of the networks within the multistandard communication system may comprise a DVB-H communication network, a cellular communication network, an IEEE 802.11 wireless local area network (WLAN), and/or an IEEE 802.16 wireless metropolitan area network (WMAN).

A high definition television (HDTV) signal may be received at a mobile terminal via a DVB-H downlink communication path. A standard definition television (SDTV) signal may be simultaneously received at the mobile terminal via a cellular downlink communication path. The SDTV signal may comprise NTSC-encoded or PAL-encoded signal. The SDTV signal and the HDTV signal may comprise the same media content. The HDTV signal received via the DVB-H downlink communication path and the SDTV signal received via the cellular downlink communication path may be selected in the mobile terminal for processing. The selection may be based on a preference indicated via the mobile terminal and/or on at least one downlink channel condition indicator corresponding to the HDTV signal or the SDTV signal. The downlink channel condition indicator may comprise one of the following: a received signal strength indicator (RSSI), a bit error rate (BER), a signal-to-noise ratio (SNR), a signal-to-interference-and-noise ratio (SINR, a power level, and a signal gain corresponding to the HDTV signal and/or the SDTV signal.

Figure 1A:
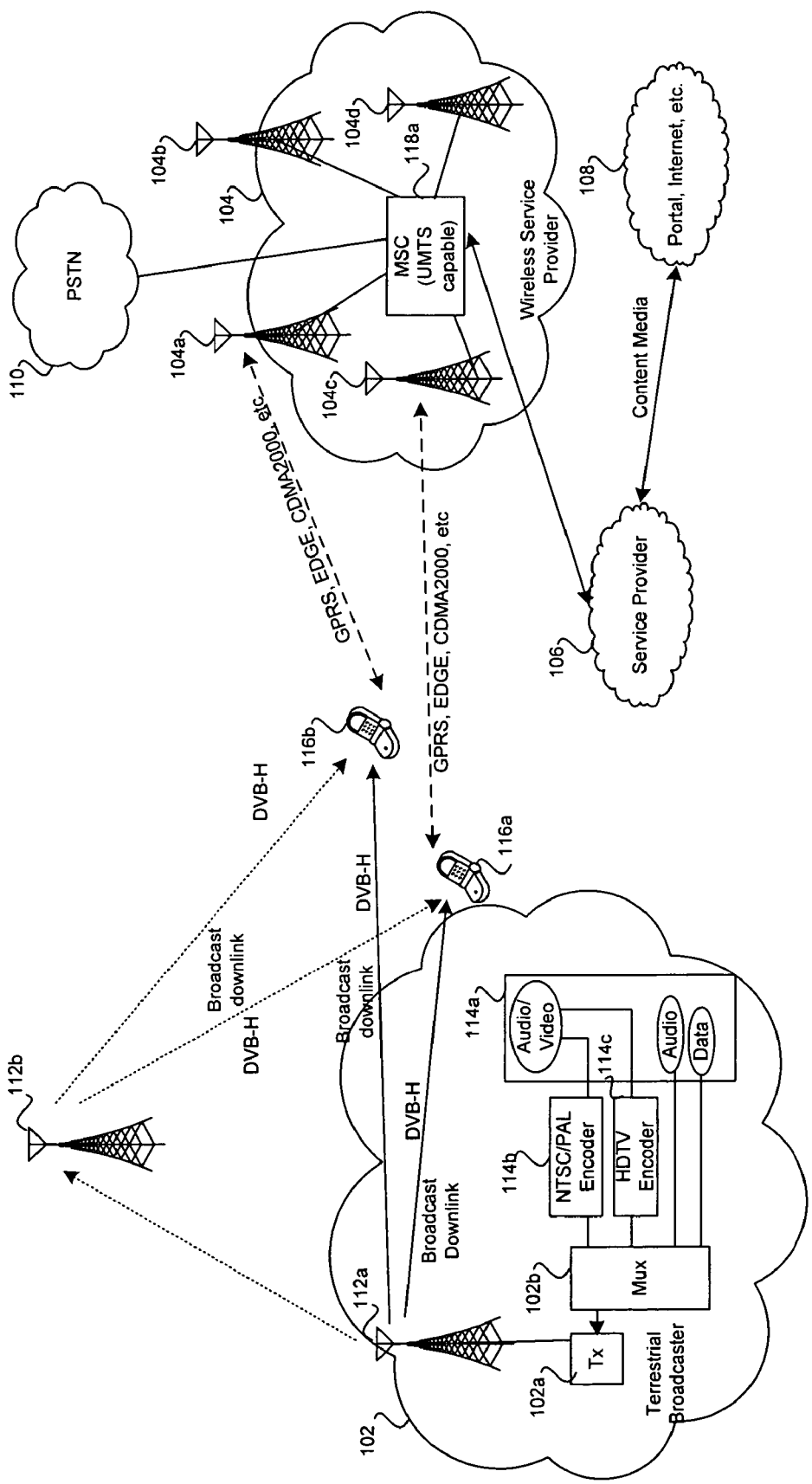
FIG. 1a is a block diagram of an exemplary system for providing services between a cellular network and a digital video broadcast (DVB) network, in accordance with an embodiment of the invention.

FIG. 1a is a block diagram of an exemplary system for providing services between a cellular network and a digital video broadcast (DVB) network, in accordance with an embodiment of the invention. Referring to FIG. 1a, there is shown terrestrial broadcaster network 102, wireless service provider network 104, service provider 106, and network 108 which may comprise the Internet, a portal, for example. FIG. 1a further comprises public switched telephone network (PSTN) 110 and mobile terminals (MTs) 116a and 116b. The MT 116b may be within the range of the terrestrial broadcast network 102 and the wireless service provider network 104. In this regard, the MT 116b may be adapted to receive multimedia content, such as HDTV-encoded multimedia content or SDTV-encoded multimedia content, from one or more base stations within the terrestrial broadcast network 102 and/or the wireless service provider network 104.

The terrestrial broadcaster network 102 may comprise transmitter (Tx) 102a, multiplexer (Mux) 102b, an NTSC/PAL encoder 114b, an HDTV encoder 114c, and information content source 114a. The content source 114a may also be referred to as a data carousel, which may comprise audio/video content, or multimedia content, audio content, and text data. The terrestrial broadcaster network 102 may also comprise VHF/UHF broadcast antennas 112a and 112b. The wireless service provider network 104 may comprise mobile switching center (MSC) 118a, and a plurality of cellular base stations 104a, 104b, 104c, and 104d.

The terrestrial broadcaster network 102 may comprise various communication devices that may be adapted to encode and/or encrypt data for transmission via the transmitter 102a. The transmitter 102a in the terrestrial broadcast network 102 may be adapted to utilize VHF/UHF broadcast channels, such as DVB-H channels to communicate HDTV-encoded information to the mobile terminals 116a and 116b. The multiplexer 102b associated with the terrestrial broadcaster network 102 may be utilized to multiplex data from a plurality of sources. For example, the multiplexer 102b may be adapted to multiplex various types of information, such as standard definition television (SDTV) signals, or NTSC/PAL signals, encoded by the NTSC/PAL encoder 114b. The multiplexer 102b may also multiplex text data, audio data, and/or high definition television (HDTV) multimedia content from the data carousel 114a encoded by the HDTV encoder 114c. The multiplexer 102b may multiplex selected data into a single pipe or stream for transmission by the transmitter 102a. In one embodiment of the invention, the data carousel 114a may be located outside the terrestrial broadcaster network 102. In this regard, information from the data carousel 114a may be communicated to the terrestrial broadcaster network 102 via a wireless and/or a wired connection.

Although communication links between the service provider 106 and the wireless service provider 104 may be wired communication links, the invention may not be so limited. Accordingly, the communication links may comprise a wireless communication link. In an exemplary embodiment of the invention, the communication link between the service provider 106 and the wireless service provider 104 may be an IEEE 802.x based communication link, such as an IEEE 802.16 WMAN or WiMax broadband access communication link. In another exemplary embodiment of the invention, the communication link may comprise a broadband line of sight (LOS) connection.

The wireless service provider network 104 may be a cellular network, such as a personal communications service network. Usage of the term cellular may comprise any band of frequencies that may be utilized for cellular telephone communication. The wireless service provider network 104 may utilize cellular access technologies such as GSM, CDMA, CDMA2000, WCDMA, HSDPA, AMPS, N-AMPS, and/or TDMA. The cellular network may be utilized to offer bidirectional services via uplink and downlink communication channels. In this regard, other bidirectional communication methodologies comprising uplink and downlink capabilities, whether symmetric or asymmetric, may be utilized.

Although the wireless service provider network 104 is illustrated as a GSM, CDMA, WCDMA based network and/or variants thereof, the invention is not limited in this regard. Accordingly, the wireless service provider network 104 may be an IEEE 802.11 wireless local area network (WLAN). Additionally, the wireless service provider network 104 may also be adapted to provide GSM, CDMA, WCDMA, CDMA2000 based network services and/or variants thereof. In this regard, the mobile terminals 116a and 116b may also be compliant with the GSM, CDMA, WCDMA, CDMA2000, and IEEE 802.11 based wireless network.

In accordance with an exemplary embodiment of the invention, if the mobile terminal (MT) 116a is within an operating range of the DVB-H broadcasting antenna 112a and moves out of the latter's operating range and into an operating range of the DVB-H broadcasting antenna 112b, then DVB-H broadcasting antenna 112b may be adapted to provide DVB-H broadcast services to the mobile terminal 116a and to communicate HDTV-encoded multimedia information to the mobile terminal 116b. If the mobile terminal 116a subsequently moves back into the operating range of the DVB-H broadcasting antenna 112a, then the broadcasting antenna 112a may be adapted to provide DVB-H broadcasting of HDTV-encoded multimedia information to the mobile terminal 116a. In a somewhat similar manner, if the mobile terminal (MT) 116b is within an operating range of the DVB-H broadcasting antenna 112b and moves out of the latter's operating range and into an operating range of the broadcasting antenna 112a, then the DVB-H broadcasting antenna 112a may be adapted to provide DVB-H broadcasting of HDTV-encoded multimedia information to the mobile terminal 116b. If the mobile terminal 116b subsequently moves back into the operating range of broadcasting antenna 112*b*, then the DVB-H broadcasting antenna 112*b* may be adapted to provide DVB-H broadcast services to the mobile terminal 116*b*.

The service provider 106 may comprise suitable interfaces, circuitry, logic and/or code that may be adapted to facilitate communication between the mobile terminals 116*a* and 116*b* and the wireless communication network 104. In an illustrative embodiment of the invention the service provider 106 may be adapted to utilize its interfaces to facilitate exchange of control information with the wireless communication network 104 and to exchange control information with the mobile terminals 116*a* and 116*b*. The control information exchanged by the service provider 106 with the wireless communication network 104 and the mobile terminals 116*a* and 116*b* may be utilized to control certain operations of the mobile terminals and the wireless communication network 104. Exemplary operations that may be controlled may comprise receiving multimedia content from the portal 108 and/or communicating multimedia content to a mobile terminal communicatively coupled to the wireless network 104. In one embodiment of the invention, the service provider 106 may be co-located with the terrestrial broadcast network 102 and/or within the wireless service provider network 104.

In accordance with an embodiment of the invention, the service provider 106 may also comprise suitable interfaces, circuitry, logic and/or code that may be adapted to handle network policy decisions. For example, the service provider 106 may be adapted to manage a load on the wireless communication network 104. A load may indicate a total amount of data, such as multimedia content, which may be requested by a plurality of mobile terminals within the wireless network 104. Load management may be utilized to control how information such as media content is distributed by the wireless communication network 104 and the terrestrial broadcaster network 102. For example, load may be distributed among the base stations 104*a*, 104*b*, 104*c*, 104*d* so as to optimally provide cellular and/or broadcast services to the mobile terminals 116*a* and 116*b*. Furthermore, the service provider 106 may utilize SDTV-encoding to encode multimedia content received from the portal 108. SDTV-encoded multimedia content may be communicated to the wireless network 104. In another embodiment of the invention, SDTV-encoding of multimedia information may be performed within the wireless network 104.

The network or portal 108 may comprise suitable interfaces, logic, circuitry and/or code that may be adapted to provide content media to the service provider 106 via one or more communication links. These communication links, although not shown, may comprise wired and/or wireless communication links. The content that may be provided by the network or portal 108 may comprise audio/video content or multimedia content, audio content, text data or any combination thereof. Furthermore, multimedia content received from the portal 108 may be encoded within the cellular network 104 prior to transmission to one or more of the mobile terminals 116*a* and 116*b*. For example, multimedia content received from the portal 108 may be encoded by an NTSC or PAL encoder within the cellular network 104. The NTSC/PAL encoded multimedia content may then be communicated to the mobile terminals 116*a* or 116*b* via a cellular downlink communication path.

Even though two multimedia sources, 108 and 114, are illustrated with regard to FIG. 1*a*, the present invention may not be so limited. The terrestrial broadcast network 102 or the cellular network 104 may utilize other sources of multimedia data, which may be coupled via a wired and/or wireless connection to the terrestrial broadcast network 102 or the cellular network 104.

The public switched telephone network (PSTN) 110 may be coupled to the MSC 118*a*. Accordingly, the MSC 118*a* may comprise suitable interfaces that may be adapted to switch calls originating from within the PSTN 110 to one or more mobile terminals serviced by the wireless service provider 104. Similarly, the MSC 118*a* may be adapted to switch calls originating from mobile terminals serviced by the wireless service provider 104 to one or more telephones serviced by the PSTN 110. In an embodiment of the invention, a T1 or T3 connection, for example, may be utilized to facilitate communication between the PSTN and the 110 and the MSC 118*a*.

In one aspect of the invention, the information content source 114*a* may comprise a data carousel. In this regard, the information content source 114*a* may be adapted to provide various information services, which may comprise audio/video content, or multimedia content, audio content, and text data. The information content source 114*a* may also comprise file download, and software download capabilities. The audio/video multimedia content may be encoded by the NTSC/PAL encoder 114*b* or the HDTV encoder 114*c* prior to transmission by the transmitter 102*a*. In instances where a mobile terminal fails to acquire requested information from the information content source 114*a* or the requested information is unavailable, then the mobile terminal may receive the requested information via, for example, a cellular channel from the portal 108. The request may be initiated through an uplink cellular communication path, for example.

The mobile terminals (MTs) 116*a* and 116*b* may comprise suitable logic, circuitry and/or code that may be adapted to handle the processing of downlink cellular channels for various access technologies and broadcast UHF/VHF technologies. In an exemplary embodiment of the invention, the mobile terminals 116*a* and 116*b* may be adapted to utilize one or more cellular access technologies such as GSM, GPRS, EDGE, CDMA, WCDMA, and CDMA2000. The mobile terminals may also be adapted to receive and process VHF/UHF broadcast signals in the VHF/UHF bands. For example, a mobile terminal such as the mobile terminal 116*a* or 116*b* may be adapted to receive and process DVB-H signals comprising HDTV encoded multimedia information via a DVB-H downlink communication path. The mobile terminals 116*a* or 116*b* may also receive and process cellular signals comprising SDTV encoded multimedia information via a cellular downlink communication path.

A mobile terminal, such as the mobile terminal 116*a* or 116*b*, may be adapted to request information via a first cellular service and in response, receive corresponding information via a DVB-H broadcast service. A mobile terminal may also be adapted to request information from a service provider via a cellular service and in response, receive corresponding information via a data service, which is provided via the cellular service. The mobile terminals may be adapted to receive DVB-H broadcast information, such as HDTV encoded multimedia information, from the DVB-H broadcast antennas 112*a* and 112*b*. In some instances, the mobile terminal may communicate corresponding uplink information via an uplink cellular communication channel.

In one embodiment of the invention, a mobile terminal may be adapted to utilize a plurality of broadcast integrated circuits for receiving and processing DVB-H channels, and a plurality of cellular integrated circuits for receiving and processing cellular or PCS channels. In this regard, the plurality of cellular integrated circuits may be adapted to handle different cellular access technologies. For example, at least one of the cellular integrated circuits may be adapted to handle GSM, and at least one of the cellular integrated circuits may be adapted to handle WCDMA. For broadcast channels, each of the plurality of broadcast integrated circuits may be adapted to handle at least one VHF/UHF channel.

In another embodiment of the invention, a mobile terminal, such as the mobile terminal 116b, may be adapted to receive broadcast information via a plurality of downlink communication paths. For example, the MT 116b may be adapted to receive HDTV-encoded multimedia content via a DVB-H broadcast communication path from the base station 112b. Furthermore, the MT 116b may receive SDTV-encoded multimedia content, such as NTSC or PAL-encoded multimedia content, from the cellular base station 104a. The SDTV-encoded content may be the same as the HDTV-encoded content. In this regard, the mobile terminal 116b may select the HDTV-encoded content received via a DVB-H downlink communication path or the SDTV-encoded content received via a cellular downlink communication path, for processing and display within the mobile terminal 116b. In an exemplary embodiment of the invention, the selection between the HDTV-encoded content or the SDTV-encoded content may be based on a type of content, on a user preference, or on downlink channel conditions of the DVB-H or cellular downlink communication paths utilized by the MT 116b to receive the HDTV or SDTV content, respectively.

Figure 1B:
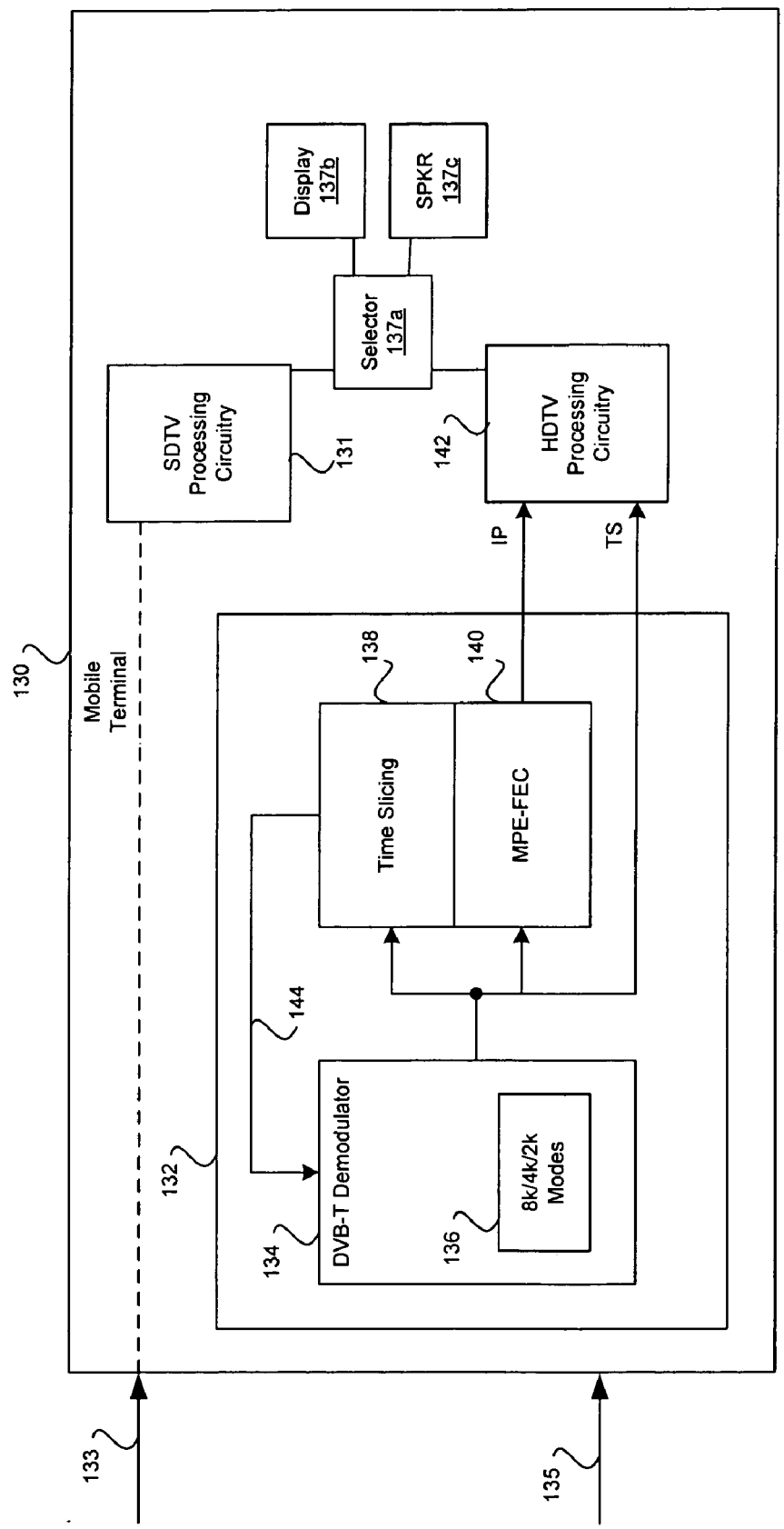
FIG. 1b is a high-level block diagram of exemplary DVB-H receiver circuitry in a mobile terminal, which may be utilized in connection with an embodiment of the invention.

FIG. 1b is a high-level block diagram of exemplary DVB-H receiver circuitry in a mobile terminal, which may be utilized in connection with an embodiment of the invention. Referring to FIG. 1b, there is shown a mobile terminal 130. The mobile terminal 130 may comprise a DVB-H demodulator 132, an SDTV processing circuitry block 131, an HDTV processing circuitry block 142, a selector block 137a, a display 137b, and a speaker 137c. The DVB-H demodulator block 132 may comprise a DVB-T demodulator 134, time slicing block 138, and MPE-FEC block 140.

The DVB-T demodulator 134 may comprise suitable circuitry, logic and/or code that may be adapted to demodulate a terrestrial DVB signal. In this regard, the DVB-T demodulator 134 may be adapted to downconvert received HDTV-encoded signals 135 to a signal with suitable bit rate that may be handled by the mobile terminal 130. The DVB-T demodulator 134 may be adapted to handle 2 k, 4 k and/or 8 k modes.

The time slicing block 138 may comprise suitable circuitry, logic and/or code that may be adapted to minimize power consumption in the mobile terminal 130, particularly in the DVB-T demodulator 134. In general, time slicing may reduce average power consumption in the mobile terminal 130 by sending data in bursts via much higher instantaneous bit rates. In order to inform the DVB-T demodulator 134 when a next burst is going to be sent, a delta indicating the start of the next burst may be transmitted within a current burst. During transmission, no data for an elementary stream (ES) may be transmitted so as to allow other elementary streams to optimally share the bandwidth. Since the DVB-T demodulator 134 knows when the next burst will be received, the DVB-T demodulator 134 may enter a power saving mode between bursts in order to consume less power. Reference signal 144 may indicate a control mechanism that handles the DVB-T demodulator 134 power via the time slicing block 138. The DVB-T demodulator 134 may also be adapted to utilize time slicing to monitor different transport streams from different channels. For example, the DVB-T demodulator 134 may utilize time slicing to monitor neighboring channels between bursts to optimize handover.

The MPE-FEC block 140 may comprise suitable circuitry, logic and/or code that may be adapted to provide error correction during decoding. On the encoding side, MPE-FEC encoding provides improved carrier to noise ratio (C/N), improved Doppler performance, and improved tolerance to interference resulting from impulse noise. During decoding, the MPE-FEC block 140 may be adapted to determine parity information from previously MPE-FEC encoded datagrams. As a result, during decoding, the MPE-FEC block 140 may generate datagrams that may be error-free even in instances when received channel conditions are poor.

The HDTV processing circuitry block 142 may comprise suitable processor, circuitry, logic and/or code that may be adapted to process IP datagrams generated from an output of the MPE-FEC block 140, which may be associated with HDTV-encoded information 135 received by the mobile terminal 130. The HDTV-encoded information 135 may be received via a DVB-H downlink communication path. The HDTV processing circuitry block 142 may also be adapted to process HDTV transport stream packets from the DVB-T demodulator 134. In one embodiment of the invention, the HDTV processing circuitry 142 may decode HDTV-encoded signals demodulated by the DVB-H demodulator 132. The decoded HDTV content may be communicated to the selector block 137a.

The SDTV processing circuitry block 131 may comprise suitable circuitry, logic, and/or code and may be adapted to demodulate and/or decode SDTV-encoded content 133 received by the mobile terminal 130. The SDTV-encoded content 133 may comprise PAL-encoded content or NTSC-encoded content. Furthermore, the SDTV-encoded content 133 may be received by the mobile terminal 130 via a cellular downlink communication path. Decoded SDTV content may be communicated by the SDTV processing circuitry block 131 to the selector block 137a. The SDTV-encoded signal 133 and the HDTV-encoded signal 135 received by the mobile terminal 130 may comprise the same content.

The selector block 137a may comprise suitable circuitry, logic, and/or code and may be adapted to select between the decoded SDTV signal or the decoded HDTV signal for further processing. In one embodiment of the invention, the selection may be based on a user preference and/or prior usage pattern. In another embodiment of the invention, the mobile terminal may determine a channel condition indicator associated with the a DVB-H downlink communication path and a cellular downlink communication path that were used to communicate the HDTV-encoded content and the SDTV-encoded content, respectively. The selector block 137a may then select between the decoded SDTV signal or the decoded HDTV signal for further processing based on the determined channel condition indicator. A method and system for communicating information in a wireless communication system utilizing channel condition indicators are further described in U.S. patent application Ser. No. 11/237,323, filed Sep. 28, 2005, which is incorporated herein by reference in its entirety.

In operation, the DVB-H demodulator 132 within the mobile terminal 130 may receive HDTV-encoded information 135 via a DVB-H downlink communication path. The DVB-H demodulator 132 may demodulate the received HDTV-encoded information and may communicate the demodulated HDTV-encoded information to the HDTV processing circuitry block 142. The HDTV processing circuitry block 142 may decode the received demodulated HDTV information and may communicate the decoded HDTV information to the selector block 137a. The SDTV processing circuitry block 131 may receive SDTV-encoded information 133 and may demodulate and decode the SDTV-encoded information. The decoded SDTV information may be communicated to the selector block 137a. The selector block 137a may select between the decoded SDTV information and the decoded HDTV information, based on one or more selection criteria. Selected HDTV or SDTV multimedia information may be displayed by the display 137b and/or may be communicated to the speaker 137c.

Figure 1C:
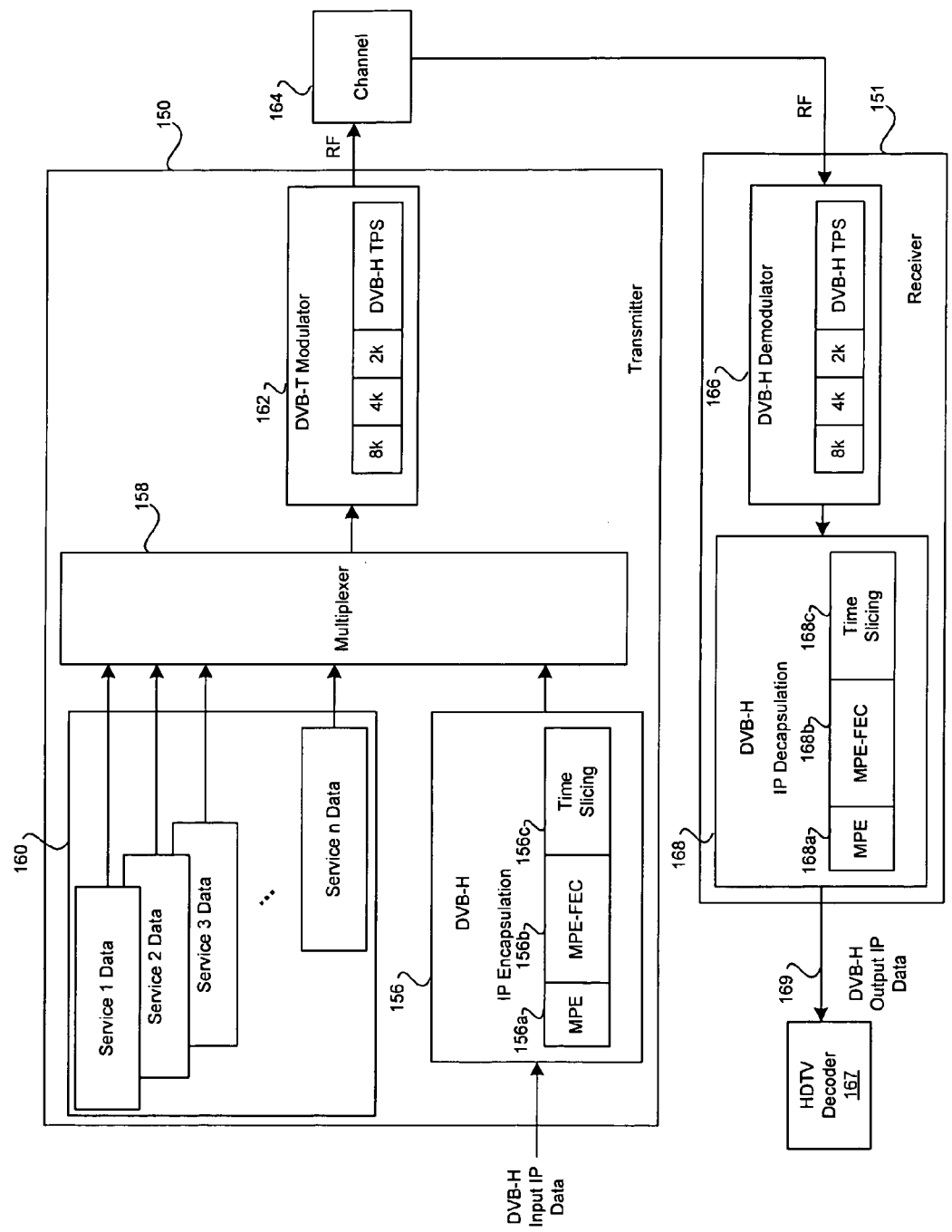
FIG. 1c is a high-level block diagram illustrating DVB-H multimedia signal processing, in accordance with an embodiment of the invention.

FIG. 1c is a high-level block diagram illustrating DVB-H multimedia signal processing, in accordance with an embodiment of the invention. Referring to FIG. 1c, there is shown a transmitter block 150, a receiver block 151, an HDTV decoder block 167, and a channel 164. The transmitter block 150 may comprise a DVB-H encapsulator block 156, a multiplexer 158, and a DVB-T modulator 162. Service data 160 may be associated with the transmitter block 150. The receiver block 151 may comprise a DVB-H demodulator block 166 and a DVB-H decapsulation block 168.

The DVB-H encapsulator block 156 may comprise MPE block 156a, MPE-FEC block 156b and time slicing block 156c. The DVB-H encapsulation block 156 may be adapted to receive and encapsulate DVB-H input data. In one embodiment of the invention, the DVB-H input data may comprise HDTV-encoded multimedia information. The multiplexer 158 may comprise suitable logic circuitry and/or code that may be adapted to handle multiplexing of IP encapsulated DVB-H input data and service data. The plurality of service data, collectively referenced as 160, may comprise MPEG-2 formatted data, which may comprise for example, audio, video and/or text data. The DVB-T modulator 162 may comprise suitable logic circuitry and/or code that may be adapted to generate an output RF signal from the transmitter block 150.

The DVB-H demodulator block 166 associated with the receiver block 151 is similar to the DVB-H demodulator block 132 of FIG. 1b. The DVB-H decapsulation block 168 may comprise MPE block 168a, MPE-FEC block 168b and time slicing block 168c. The DVB-H decapsulation block 168 may comprise suitable logic, circuitry and/or code that may be adapted decapsulate the IP data that was encapsulated and multiplexed by the transmitter block 150. The output of the DVB-H demodulator 166 may comprise transport stream packets. The transport stream packets may comprise the multiplexed output generated by the multiplexer 158.

In operation, HDTV-encoded input data may be encapsulated by the DVB-H encapsulator block 156. The encapsulated HDTV-encoded data may be modulated by the DVB-T modulator 162 and may be transmitted by the transmitter 150 via the channel 164. The receiver 151, which may be within a mobile terminal, may receive the encoded HDTV information. The receiver 151 may then demodulate and decapsulate the received HDTV-encoded information, generating demodulated and decapsulated HDTV-encoded data 169. The HDTV-encoded data 169 may then be decoded by the HDTV decoder 167.

Figure 2A:
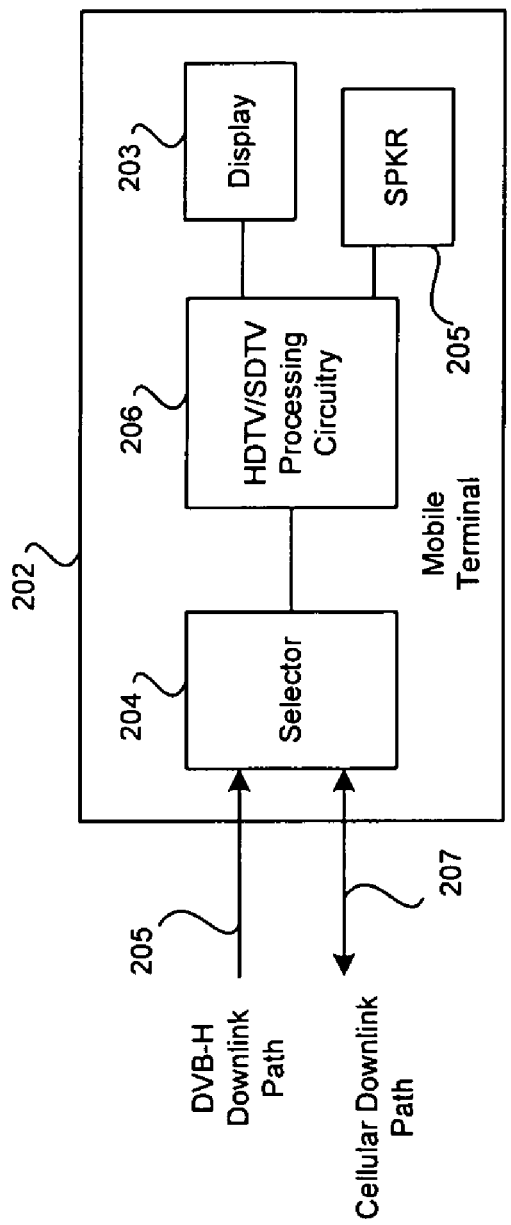
FIG. 2a is diagram of a mobile terminal that is adapted to receive DVB-H and cellular communications, in accordance with an embodiment of the invention.

FIG. 2a is diagram of a mobile terminal that is adapted to receive DVB-H and cellular communications, in accordance with an embodiment of the invention. Referring to FIG. 2a, there is shown mobile terminal (MT) or handset 202. The mobile terminal 202 may comprise a selector block 204, HDTV/SDTV processing circuitry 206, a display 203, and a speaker 205. The selector block 204 may comprise suitable circuitry, logic, and/or code and may be adapted to select between a received HDTV-encoded signal 205 and a received SDTV-encoded signal 207 for processing within the mobile terminal 202. The HDTV-encoded signal 205 may be received via a DVB-H downlink communication path, and the SDTV-encoded signal 207 may be received via a cellular downlink communication path. The received HDTV-encoded signal 205 and the received SDTV-encoded signal 207 may comprise the same multimedia content.

The HDTV/SDTV processing circuitry 206 may comprise suitable circuitry, logic, and/or code and may be adapted to demodulate and/or decode received HDTV-encoded signals and SDTV-encoded signals. In this regard, the HDTV/SDTV processing circuitry 206 may comprise at least one receiver front end (RFE) circuit and at least one signal decoder. In an embodiment of the invention, a first of the receiver front end circuits may be adapted to handle RF processing of a DVB-H broadcast channel and a second of these RFE circuits may be adapted to handle RF processing of a cellular channel. In an embodiment of the invention, a single RF integrated circuit may comprise a plurality of RFE processing circuits, each of which may be adapted to process a particular cellular channel. Accordingly, a single RFIC comprising a plurality of cellular RFE processing circuits may be adapted to handle a plurality of cellular channels.

In one embodiment of the invention, the HDTV/SDTV processing circuitry 206 may be implemented within a single chip and may comprise a plurality of DVB-H, cellular RFE processing circuits, as well as HDTV and SDTV decoding circuitry. In this regard, the mobile terminal 202 may be adapted to simultaneously handle a plurality of different DVB-H and cellular channels. For example, a mobile terminal may be adapted to simultaneously receive a first DVB-H channel bearing HDTV-encoded information and a second cellular channel bearing SDTV-encoded information. Processing between the DVB-H channel and the cellular channel may be user-selectable via the selector block 204. Decoded HDTV information or SDTV information may be communicated to the display 203 and/or the speaker 205.

Figure 2B:
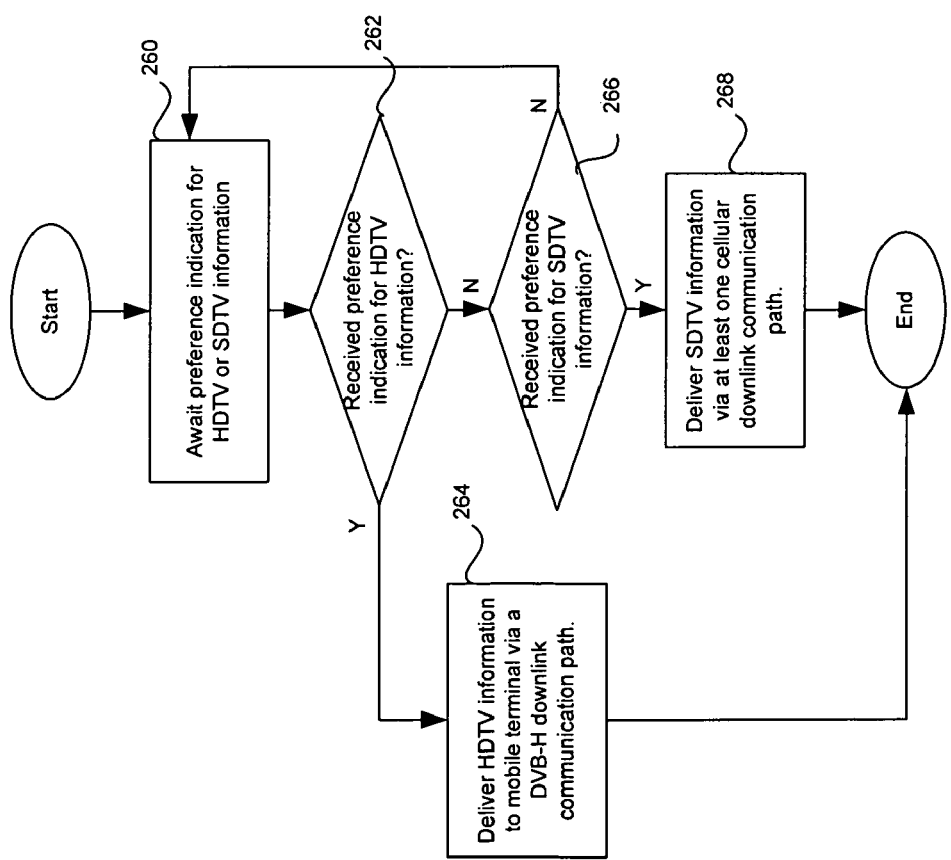
FIG. 2b is a flow diagram illustrating exemplary steps utilized by a mobile terminal that may be adapted to receive HDTV and SDTV information, in accordance with an embodiment of the invention.

FIG. 2b is a flow diagram illustrating exemplary steps utilized by a mobile terminal that may be adapted to receive HDTV and SDTV information, in accordance with an embodiment of the invention. Referring to FIGS. 2a and 2b, at 260, the mobile terminal 202 may await a preference indication for HDTV-encoded content or SDTV-encoded content. Such indication may be received by the selector block 204 via a user-controlled interface, for example, and may be associated with a user profile and/or prior usage of HDTV-encoded information and SDTV-encoded information. At 262, it may be determined whether a preference indication is received by the selector block 204 specifying that HDTV-encoded information is received. If the preference indication specifying that HDTV-encoded information is received, at 264, the HDTV-encoded information 205 may be delivered to the mobile terminal 202 via a DVB-H downlink communication path. If preference indication for broadcast information is not received by the selector block 204, at 266, it may be determined whether preference indication for SDTV-encoded information is received by the selector block 204. If preference indication for SDTV-encoded information is received, at 268, SDTV-encoded information may be delivered to the mobile terminal 202 via a cellular downlink communication path.

Figure 2C:
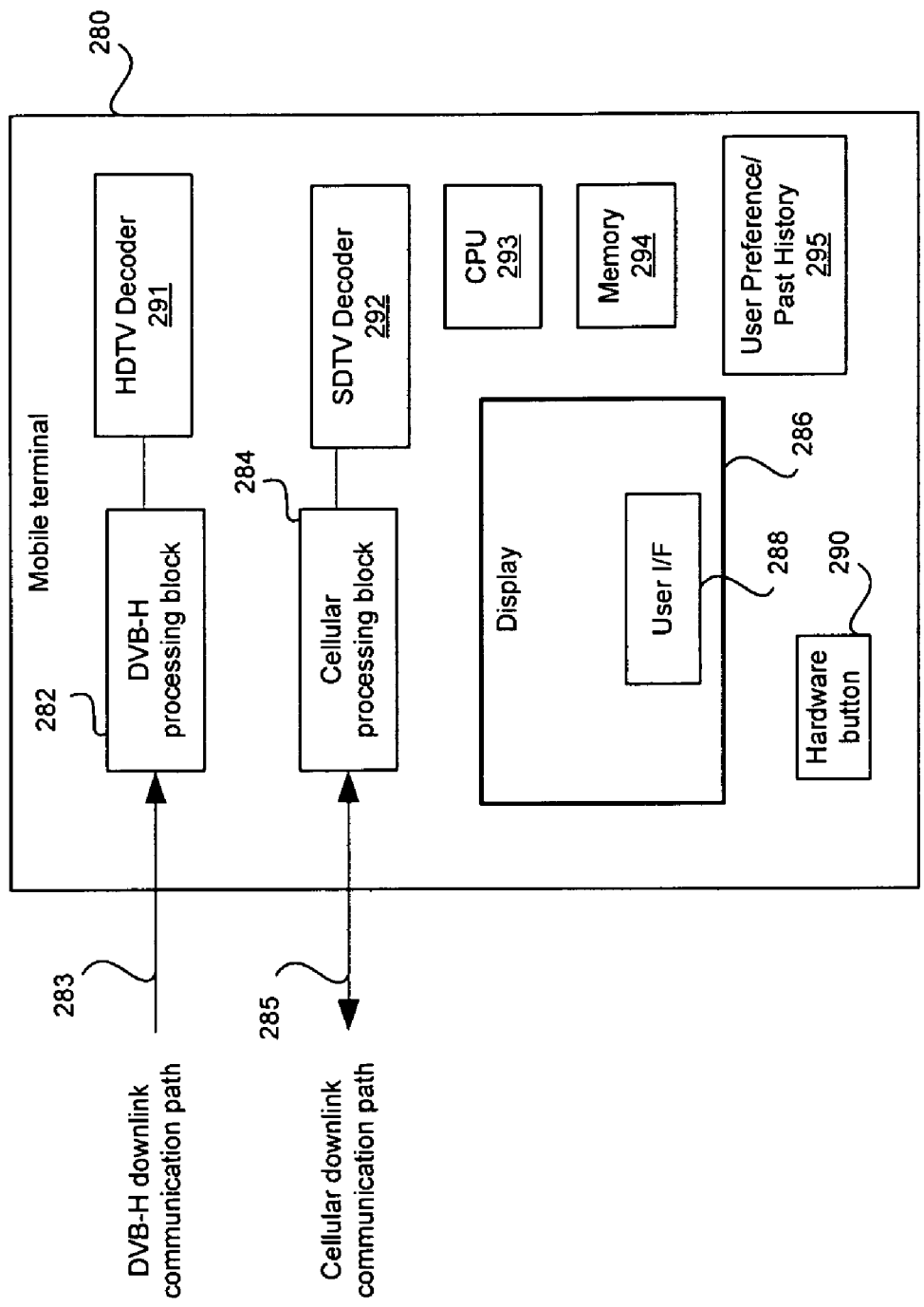
FIG. 2c is a block diagram illustrating exemplary communication for a mobile terminal via a plurality of different communication paths, in accordance with an embodiment of the invention.

FIG. 2c is a block diagram illustrating exemplary communication between a mobile terminal via a plurality of different communication paths, in accordance with an embodiment of the invention. Referring to FIG. 2c, there is shown a mobile terminal 280 that comprises a DVB-H processing block 282, a cellular processing block 284, an HDTV decoder 291, an SDTV decoder 292, a CPU 293, a memory 294, user preference/past history block 295, a display 286, and a hardware button 290. The mobile terminal 280 may comprise suitable logic, circuitry, and/or code that may be adapted to communicate and process information from a plurality of different networks. In this regard, the mobile terminal 280 may receive information, such as multimedia information, via a DVB-H downlink communication path 283 and/or a bidirectional cellular downlink communication path 285. For example, the mobile terminal 280 may receive HDTV-encoded information via the DVB-H downlink communication path 283 and SDTV-encoded information via the cellular downlink communication path 285. The mobile terminal 280 may also transmit information via the bidirectional cellular communication path 285. In this regard, the transmitted information may be associated with information received from the DVB-H downlink communication path 283 and/or the cellular downlink communication path 285.

The DVB-H processing block 282 may comprise suitable logic, circuitry, and/or code that may be adapted to process broadcast information from, for example, the DVB-H downlink communication path 283. For example, the DVB-H processing block 282 may be adapted to demodulate HDTV-encoded information received via the DVB-H downlink communication path 283. The cellular processing block 282 may comprise suitable logic, circuitry, and/or code that may be adapted to process cellular information received from, for example, the cellular downlink communication path 285. The cellular processing block 284 may comprise different portions that may process information associated with different cellular communication paths. Furthermore, the cellular processing block 284 may be adapted to demodulate SDTV-encoded information received via the cellular downlink communication path 285. Demodulated HDTV-encoded signals may be decoded by the HDTV decoder 291. Similarly, demodulated SDTV-encoded signals may be decoded by the SDTV decoder 292.

In an exemplary aspect of the invention, the mobile terminal 280 may be adapted to select between reception of HDTV-encoded information via the DVB-H downlink communication path 283 and SDTV-encoded information, such as PAL-encoded signals or NTSC-encoded signals via the cellular downlink communication path 285. The selection may be achieved via a software-controlled and/or user-controlled interface. For example, switching between reception of HDTV-encoded information and SDTV-encoded information may be achieved by utilizing a switch at the mobile terminal 280, such as the hardware button 290. In another aspect of the invention, the display 286 may be adapted to display a user interface 288.

The user interface 288 may be software-controlled, for example. In this regard, the user interface 288 may acquire user input and selecting the HDTV-encoded information or the SDTV-encoded information for processing within the mobile terminal 280 may be achieved by utilizing the software-controlled user interface 288. In another embodiment of the invention, selecting the HDTV-encoded information or the SDTV-encoded information for processing within the mobile terminal 280 may be achieved by utilizing the user preference/past history block 295. In this regard, a user profile may specify that HDTV-encoded information may be processed if a downlink channel condition indicator of the DVB-H downlink communication path is at a certain threshold level. If the downlink channel condition of the DVB-H downlink communication path is below the threshold level, SDTV-encoded information may be selected for processing. The threshold level of a downlink channel condition indicator, such as a BER, may indicate a value of the channel condition indicator such that if the condition indicator is below a certain value, the downlink communication path may be considered to be in a deteriorated condition and SDTV-encoded information may be selected for processing as it requires less bandwidth for communication to the mobile terminal. Similarly, that if the condition indicator is above a certain value, the downlink communication path may be considered to be in a good condition and higher bandwidth signals, such as HDTV-encoded signals, may be communicated to the mobile terminal.

Figure 3:
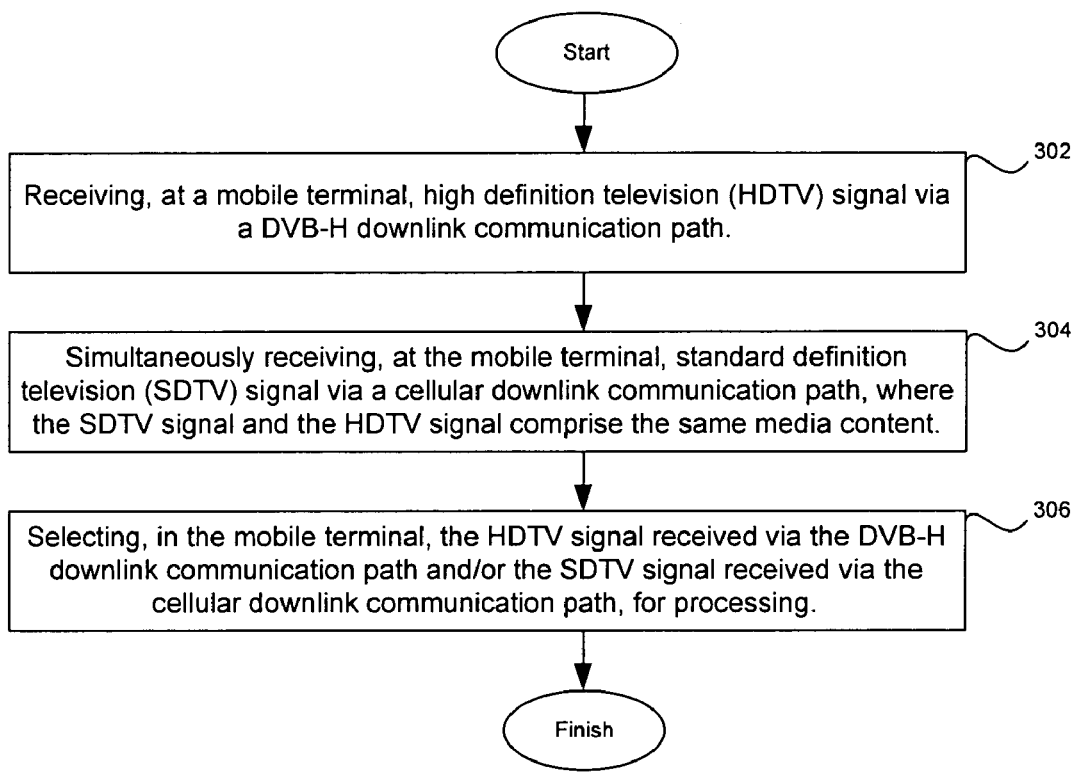
FIG. 3 is a flow diagram illustrating exemplary steps for communicating information in a network, in accordance with an embodiment of the invention.

FIG. 3 is a flow diagram illustrating exemplary steps for communicating information in a network, in accordance with an embodiment of the invention. Referring to FIGS. 2c and 3, at 302, high definition television (HDTV) signal may be received by the mobile terminal 280 via a DVB-H downlink communication path 283. At 304, standard definition television (SDTV) signals may be simultaneously received by the mobile terminal 280 via the cellular downlink communication path 285. The received SDTV signal and the received HDTV signal may comprise the same media content. At 306, the HDTV signal received via the DVB-H downlink communication path 283 or the SDTV signal received via the cellular downlink communication path 285 may be selected within the mobile terminal 280 for processing. The selection may be based on a preference indicated via the mobile terminal 280. The selection may also be based on at least one downlink channel condition indicator corresponding to the HDTV signal communicated via the DVB-H downlink communication path 283 and the SDTV signal communicated via the cellular downlink communication path 285.

The at least one downlink channel condition indicator may comprise at least one of: a received signal strength indicator (RSSI), a bit error rate (BER), a signal-to-noise ratio (SNR), a signal-to-interference-and-noise ratio (SINR, a power level, and a signal gain corresponding to the HDTV signal communicated via the DVB-H downlink communication path and the SDTV signal communicated via the cellular downlink communication path. A user input that indicates whether to select the received HDTV signal or the received SDTV signal may be received by the mobile terminal 280. The mobile terminal may be configured to display the received HDTV signal. The selecting may be based on a type of the media content. The SDTV signal and the HDTV signal may be decoded within a single chip integrated within the mobile terminal 280. An indication of content that may be available via the DVB-H downlink communication path 283 and the cellular downlink communication path 285 may be displayed within the mobile terminal 280. A signal that instructs a service provider to deliver HDTV content via the DVB-H downlink communication path 283 may be generated within the mobile terminal 280.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating information in a network, the method comprising:
   receiving, at a mobile terminal, high definition television (HDTV) signal via a DVB-H downlink communication path;
   simultaneously receiving, at said mobile terminal, standard definition television (SDTV) signal via a cellular downlink communication path, wherein said SDTV signal and said HDTV signal comprise the same media content;
   selecting, in said mobile terminal, one of the following: said HDTV signal received via said DVB-H downlink communication path and said SDTV signal received via said cellular downlink communication path, for processing; and
   generating, in said mobile terminal, a signal that instructs a service provider to deliver HDTV content via said DVB-H downlink communication path.

2. A non-transitory computer-readable medium having stored thereon, a computer program having at least one code section for communicating information in a network, the at least one code section being executable by a computer for causing the computer to perform steps comprising:
   receiving, at a mobile terminal, high definition television (HDTV) signal via a DVB-H downlink communication path;
   simultaneously receiving, at said mobile terminal, standard definition television (SDTV) signal via a cellular downlink communication path, wherein said SDTV signal and said HDTV signal comprise the same media content;
   selecting, in said mobile terminal, one of the following: said HDTV signal received via said DVB-H downlink communication path and said SDTV signal received via said cellular downlink communication path, for processing; and
   generating, in said mobile terminal, a signal that instructs a service provider to deliver HDTV content via said DVB-H downlink communication path.

3. A system for communicating information in a network, the system comprising:
   at least one circuitry that receives, at a mobile terminal, high definition television (HDTV) signal via a DVB-H downlink communication path;
   said at least one circuitry simultaneously receives, at said mobile terminal, standard definition television (SDTV) signal via a cellular downlink communication path,
   wherein said SDTV signal and said HDTV signal comprise the same media content; and said at least one circuitry selects, in said mobile terminal, one of the following:
   said HDTV signal received via said DVB-H downlink communication path and said SDTV signal received via said cellular downlink communication path, for processing,
   wherein said at least one circuitry generates, in said mobile terminal, a signal that instructs a service provider to deliver HDTV content via said DVB-H downlink communication path.

* * * * *